United States Patent [19]

Kölle et al.

[11] Patent Number: 4,898,423

[45] Date of Patent: Feb. 6, 1990

[54] DEVICE FOR CHANGING THE INCLINATION OF THE BACK-REST OF A VEHICLE SEAT

[75] Inventors: Erwin Kölle, Sindelfingen; Josef Klink, Nagold, both of Fed. Rep. of Germany

[73] Assignee: Daimler Benz AG, Stuttgart, Fed. Rep. of Germany

[21] Appl. No.: 705,349

[22] Filed: Feb. 25, 1985

[30] Foreign Application Priority Data

Feb. 28, 1984 [DE] Fed. Rep. of Germany ....... 3407159

[51] Int. Cl.[4] .............................................. A47C 3/02
[52] U.S. Cl. ........................................ 297/362; 24/342
[58] Field of Search ............... 297/361, 362, 330, 410; 74/373, 342, 411.5; 192/95

[56] References Cited

U.S. PATENT DOCUMENTS

| | | | |
|---|---|---|---|
| 1,322,388 | 11/1919 | Wood | 74/342 |
| 2,185,846 | 1/1940 | Hacmac | 74/342 X |
| 3,105,675 | 10/1963 | Blackburn | 74/342 X |
| 3,485,109 | 12/1969 | Dunlap | 74/411.5 X |
| 3,738,706 | 6/1973 | Caldemeyer | 297/410 |
| 4,216,624 | 8/1980 | Blankenberg et al. | 74/411.5 X |
| 4,331,039 | 5/1982 | Ruge | 74/373 X |

FOREIGN PATENT DOCUMENTS

| | | |
|---|---|---|
| 7521032 | 2/1975 | Fed. Rep. of Germany . |
| 2905334 | 8/1980 | Fed. Rep. of Germany ...... 297/362 |

*Primary Examiner*—James T. McCall
*Assistant Examiner*—Mark Binder
*Attorney, Agent, or Firm*—Barnes & Thornburg

[57] ABSTRACT

An apparatus is provided for adjusting a vehicle seat having a movable support member. The apparatus includes a first frame member and a second frame member pivotably articulated to the first frame member. A backrest is desirably mounted on the second frame member. First and second driven gears are rotatably mounted on the first frame member. The apparatus further includes a first transmission system for pivoting the second frame member in relation to the first frame member to change the inclination of the second frame member and a second transmission system for changing the position of the movable support member in relation to the second frame member. The first transmission system is activated in response to rotation of the first driven gear and the second transmission system is activated in response to rotation of the second driven year. A control element is provided for selectively engaging either the first driven gear to activate the first transmission system or the second driven gear to activate the second transmission system. In operation, the control element is selectively movable by an operator to its first position to permit the operator to change the inclination of the second frame member or to its second position to permit the operator to change the position of the movable support member.

7 Claims, 1 Drawing Sheet

DEVICE FOR CHANGING THE INCLINATION OF THE BACK-REST OF A VEHICLE SEAT

BACKGROUND AND SUMMARY OF THE INVENTION

The invention relates to a vehicle seat adjustment device and particularly to a device for selectively changing the inclination of a vehicle seat backrest or the comfort position of an armrest, headrest, or other support member of a vehicle seat.

A known adjusting device includes a hand wheel which is mounted on a first fitting part, the rotary movements of which are transmitted on the power take-off side via an intermediate gear stage to a further gear mounted on the first fitting part. In the transmission path, there is a braking device which allows the rotary movement emanating from the hand wheel to be transmitted to a second fitting part articulated to the first fitting Part, but which produces a locking effect when force is introduced in reverse.

An adjusting device of the type described above is known, in principle, from German Unexamined Published Patent Application No. 2,905,334. The braking device is assigned to the hand wheel in order to provide the adjusting device on a production vehicle. Although the hand wheel is moved into an easily accessible region, nevertheless only a single adjusting device can be actuated via the hand wheel as a result of this known arrangement.

According to the present invention, an apparatus is provided for adjusting a vehicle seat having a movable support member. The apparatus includes a first frame member and a second fame member pivotably articulated to the first frame member. A backrest is desirably mounted on the second frame member. First and second driven gears are rotatably mounted on the first frame member.

The apparatus further includes first transmission means for pivoting the second frame member in relation to the first frame member to change the inclination of the second frame member and second transmission means for changing the position of the movable support member in relation to the second frame member. The first transmission means is activated in response to rotation of the first driven gear and the second transmission means is activated in response to rotation of the second driven year. Control means is provided for selectively engaging either the first driven gear to activate the first transmission means or the second driven gear to activate the second transmission means. The control means is movable in relation to the first frame member to a first position to engage the first driven gear and to a second position to engage the second driven gear. The control means includes a shaft mounted on the first frame member for rotation about an axis and for movement along said axis. A driving gear is fixed to one end of the shaft for selective engagement of the first or second driven gears. A hand wheel is fixed to the other end of shaft for imparting rotation to driving gear to rotate the selected driven gear.

In addition, first brake means is provided for preventing rotation of the first driven gear in at least one direction when the first driven gear and the driving gear are disengaged.

Second brake means is also provided for preventing rotation of the second driven gear in at least one direction when the second driven gear and the driving gear are disengaged. In operation, the control means is selectively movable by an operator to its first position to permit the operator to rotate the hand wheel to activate the first transmission means thereby changing the inclination of the second frame member or to its second position to permit the operator to rotate the hand wheel to activate the second transmission means thereby changing the position of the movable support member.

One object of the present invention is to redesign the known device in such a way that the adjusting movement of the hand wheel can be imparted so a further adjustable device (e.g. armrest or headrest) bearing no functional relationship to the backrest inclination adjustment, while at the same time ensuring that the position of the particular device not actuated by the hand wheel cannot change automatically.

This object is achieved, in part, because the second brake means of the intermediate gear stag is assigned to a first transmission path, because the hand wheel is displaceable in the axial direction, and because the driving gear on the power take-off side can be engaged selectively with the first driven gear or with a second gear which is located in a second transmission path. The rotary movement of the second driven gear is transmitted, with the first brake means being interposed, to a built-on or built-in part assigned to the backrest, such as a head or armrest, for the purpose of adjusting the latter.

Although it is known per se from German Utility Model No. 7,521,032, on a vehicle seat, to engage the gear on the power take-off side selectively with two different gears as a result of displacement of a hand wheel in the axial direction, nevertheless here the gears are arranged axially in series and are in a direct functional relationship with one another. Furthermore, a spindle drive is inserted as a brake in each transmission path, thus resulting in a high transmission ratio unsuitable for rapid adjustment.

Further objects, features, and advantages of the present invention will become more apparent from the following description when taken with the accompanying drawing which shows, for purpose of illustration only, an embodiment in accordance with the present invention.

BRIEF DESCRIPTION OF THE DRAWING

The drawing is a top plan view of one preferred embodiment of the present invention.

DETAILED DESCRIPTION OF THE DRAWING

Figure 1:
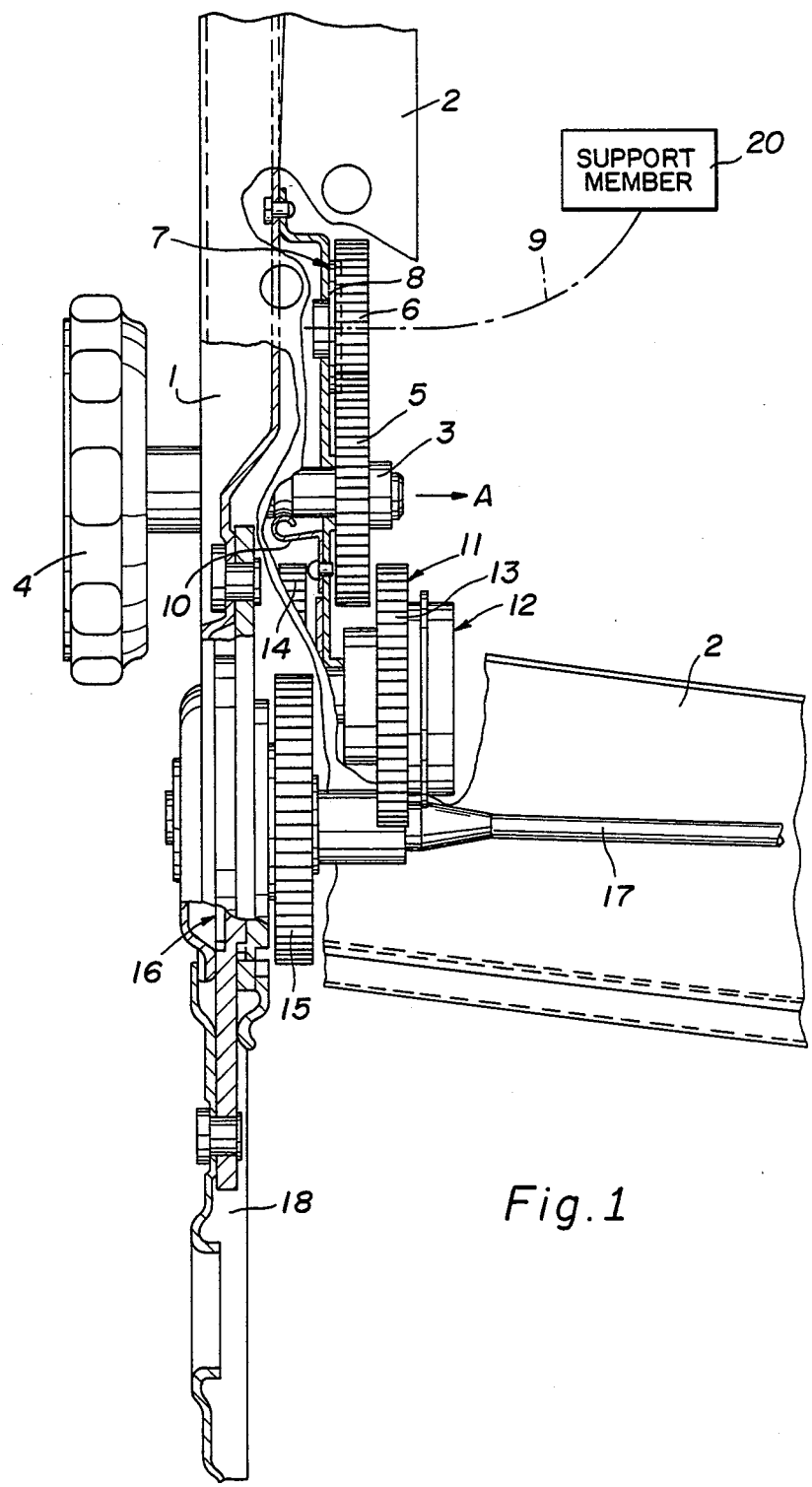

A shaft 3 is mounted on a first frame member 1, which is connected rigidly to a back-rest frame 2 not shown in any more detail, and receives a hand wheel 4 at one end and a gear 5 at its other end. The latter meshes with a further gear 6 which is likewise mounted on the first frame member 1 and to which a clutch or other brake 7 in the form of a friction disc 8 is assigned. The rotary movement of the gear 6 is imparted, via a remote-actuation means 9 indicated by broken lines, to a support member 20 such as a head-rest and serves for adjusting the height of the latter.

The shaft 3 is displaceable in the direction of the arrow A, together with the hand wheel 4, and a detent spring 10, which can also be designed as an overrun spring, secures, in interaction with the shaft 3, the sliding position which can be reached. The initial position already described is also secured in the same way.

When the hand wheel 4 is pressed in, the gear 5 assigned to it engages with an intermediate gear stage 11 which contains a braking device 12 in the form of a wrap-spring clutch (not shown) and which also has a gear 13 on the drive side, meshing with the gear 5, and a gear 14 on the power take-off side. The latter acts on a further gear 15 which is mounted on the first frame member 1 and the rotary movement of which is transmitted to a pivoting device 16, not shown in any more detail, on the associated near side and via a shaft 17 to a joint fitting (not shown) which is located opposite. The adjusting movement initiated in this way is supported via a second frame member 18 articulated to the first frame member 1 and connected firmly to a seat-cushion frame (not shown), so that a pivoting movement of the back-rest frame 2 takes place.

During the time when the gear 5 is disengaged from the gear 6, the friction disc 8 ensures that the height of the head rest does not change. Furthermore, as a result of a locking effect, the braking device 12 designed as a wrap-spring clutch prevents adjustment from being caused via the back-rest, for example, forces introduced in the event of a collision. This braking effect also arises when there is no drive-through to the hand wheel 4.

Although the invention has been described in detail with reference to certain preferred embodiments and specific examples, variations and modifications exist within the scope and spirit of the invention as described and defined in the following claims.

What is claimed is:

1. An apparatus for changing the inclination of the back-rest of a vehicle seat, the apparatus comprising:
    a first frame member,
    a second frame member pivotably articulated to the first frame member, the back-rest being fixable to the first frame member,
    a hand wheel mounted on the first frame member for rotation about an axis, the hand wheel being displaceable along said axis,
    a driving gear coupled to the hand wheel for rotation and axial displacement therewith,
    first transmission means for moving the first frame member, the first transmission means including one driven gear rotatably mounted on the second frame member, and intermediate gear stage means for interconnecting the driving gear and the one driven gear to impart rotary motion to the driven gear in response to a rotation of the driving gear to effect pivoting of the first frame member with respect to the second frame member,
    a support member drivingly engageable with the driving gear and movable in relation to the back-rest,
    second transmission means for drivingly engaging the support member and moving the support member in relation to the back-rest, the second transmission means including another driven gear rotatably mounted on the first frame member,
    the driving gear being selectively engageable with one of the intermediate gear stage means to move the first frame member and said another driven gear to move the support member,
    first brake means operatively connected to said one driven gear for preventing rotation of said one driven gear in at least one direction when the intermediate gear stage means and the driving gear are disengaged, and
    second brake means operatively connected to said another driven gear for preventing rotation of said another driven gear in at least one direction when said another driven gear and the driving gear are disengaged,
    whereby the hand wheel is axially displaceable and rotatable by an operator to permit the operator to selectively activate one of the first transmission means to adjust the inclination of the back-rest and the second transmission means to adjust the position of the support member.

2. The apparatus of claim 1, wherein the first brake means is a wrap-spring clutch.

3. The apparatus of claim 1, wherein the first transmission path means further includes an intermediate drive gear for engaging the driving gear and an intermediate driven gear engaging said one driven gear and connected to said intermediate drive gear for rotation therewith.

4. The apparatus of claim 1, wherein the second brake means includes at least one friction disc coaxially aligned in relation to the axis of rotation of said another driven gear.

5. The apparatus of claim 1, further comprising shaft means for rotatably and slidably supporting the hand wheel and the driving gear on the first frame member, the shaft means including detent means for selectively retaining the driving gear in one of a first position to engage the intermediate gear stage means and a second position to engage said another driven gear.

6. An apparatus for adjusting a vehicle seat having a movable support member, the apparatus comprising:
    a first frame member,
    a second frame member pivotably articulated to the first frame member,
    first and second driven gears rotatably mounted on the first frame member,
    first transmission means, responsive to rotation of the first driven gear for pivoting the first frame member in relation to the second frame member to change the inclination of the first frame member, said first transmission means drivingly connecting the first driven gear and the first frame member,
    second transmission means, responsive to rotation of the second driven gear, for changing the position of the movable support member in relation to the first frame member, said second transmission means drivingly connecting the second driven gear and the support member,
    control means for selectively engaging one of the first driven gear to activate the first transmission means and the second driven gear to activate the second transmission means, the control means being movable in relation to the first frame member to a first position to engage the first driven gear and to a second position to engage the second driven gear, the control means including a shaft mounted on the first frame member for rotation about an axis and for movement along said axis, a driving gear fixed to one end of the shaft for selective engagement of one of the first and second driven gears, and a hand wheel fixed to the other end of the shaft for imparting rotation to the driving gear to rotate the selected driven gear,
    first brake means for preventing rotation of the first driven gear in at least one direction when the first driven gear and the driving gear are disengaged, and second brake means for preventing rotation of the second driven gear in at least one direction when the second driven gear and the driving gear are disengaged, whereby the control means is selectively movable by an operator to its first position to permit the operator to rotate the hand wheel to activate the first transmission means thereby changing the inclination of the first frame member or to its second position to permit the operator to rotate the hand wheel to activate the second transmission means thereby changing the position of the movable support member.

7. An apparatus for adjusting a vehicle seat having a movable support member, the apparatus comprising:

a first frame member, a second frame member pivotably articulated to the first frame member, first and second driven gears rotatably mounted on the first frame member, first transmission means, responsive to rotation of the first driven gear, for pivoting the first frame member in relation to the second frame member to change the inclination of the first frame member, said first transmission means drivingly connecting the first driven gear and the first frame member, second transmission means, responsive to rotation of the second driven gear, for changing the position of the movable support member in relation to the first frame member, said second transmission means drivingly connecting the second driven gear and the support member, control means for selectively engaging one of the first driven gear to activate the first transmission means and the second driven gear to activate the second transmission means, the control means being movable in relation to the first frame member to a first position to engage the first driven gear and to a second position to engage the second driven gear, the control means including a shaft mounted on the first frame member for rotation about an axis and for movement along said axis, a driving gear fixed to one end of the shaft for selective engagement of one of the first and second driven gears, and a hand wheel fixed to the other end of the shaft for imparting rotation to the driving gear to rotate the selected driven gear, whereby the control means is selectively movable by an operator to its first position to permit the operator to rotate the hand wheel to activate the first transmission means thereby changing the inclination of the first frame member or to its second position to permit the operator to rotate the hand wheel to activate the second transmission means thereby changing the position of the movable support member.

* * * * *